US007246122B2

(12) United States Patent
Lucovsky

(10) Patent No.: US 7,246,122 B2
(45) Date of Patent: *Jul. 17, 2007

(54) SCHEMA-BASED SERVICES FOR IDENTITY-BASED DATA ACCESS TO FAVORITE WEBSITE DATA

(75) Inventor: Mark H. Lucovsky, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 391 days.

This patent is subject to a terminal disclaimer.

(21) Appl. No.: 10/187,190

(22) Filed: Jun. 28, 2002

(65) Prior Publication Data

US 2004/0002976 A1 Jan. 1, 2004

(51) Int. Cl.
G06F 17/30 (2006.01)
(52) U.S. Cl. .............................. 707/10; 707/1; 707/100
(58) Field of Classification Search ............. 707/104.1, 707/102, 103 R, 1–10, 100
See application file for complete search history.

(56) References Cited

U.S. PATENT DOCUMENTS 5,819,092 A * 10/1998 Ferguson et al. ........... 717/113
5,930,801 A * 7/1999 Falkenhainer et al. .. 707/103 R
6,151,624 A * 11/2000 Teare et al. ................. 709/217
6,253,204 B1 * 6/2001 Glass et al. ................. 707/102
6,327,574 B1 * 12/2001 Kramer et al. ................ 705/14
6,711,585 B1 * 3/2004 Copperman et al. ...... 707/104.1
6,820,204 B1 * 11/2004 Desai et al. ................. 713/201
2002/0013788 A1 * 1/2002 Pennell et al. ............... 707/507

* cited by examiner

Primary Examiner—Don Wong
Assistant Examiner—Sheree Brown
(74) Attorney, Agent, or Firm—Workman Nydegger

(57) ABSTRACT

A schema-based FavoriteWebsites service for centralized access to per-user favorite website data, wherein access to data is based on each user's identity. The FavoriteWebsites service includes a schema that defines rules and a structure for each user's data, and also includes methods that provide access to the data in a defined way. The FavoriteWebsites schema thus corresponds to a logical document containing the data for each user. The user manipulates (e.g., reads or writes) data in the logical document by data access requests through defined methods. The structure of the data is defined from the perspective of the data, not from that of an application program or a device, whereby appropriate programs can communicate with the FavoriteWebsites service to access the data, with existing knowledge of the schema-defined format, regardless of the device or application program in use.

15 Claims, 4 Drawing Sheets

SCHEMA-BASED SERVICES FOR IDENTITY-BASED DATA ACCESS TO FAVORITE WEBSITE DATA

CROSS REFERENCE TO RELATED APPLICATIONS

The present application claims priority from U.S. patent application Ser. No. 10/017,680, filed Oct. 22, 2002, which claims priority from U.S. provisional application Ser. No. 60/275,809, filed Mar. 14, 2001 and entitled "Identity-Based Service Communication Using XML Messaging Interfaces," which are hereby incorporated herein by reference in their entireties.

COPYRIGHT DISCLAIMER

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The invention relates generally to computer network data access, and more particularly to systems, methods and data structures for accessing data and data-related services over a network.

BACKGROUND OF THE INVENTION

There are many types of data that users need to manage and otherwise access. For example, users keep word processing documents, spreadsheet documents, calendars, telephone numbers and addresses, e-mail messages, financial information and so on. In general, users maintain this information on various personal computers, hand-held computers, pocket-sized computers, personal digital assistants, mobile phones and other electronic devices. In most cases, a user's data on one device is not accessible to another device, without some manual synchronization process or the like to exchange the data, which is cumbersome. Moreover, some devices do not readily allow for synchronization. For example, if a user leaves his cell phone at work, he has no way to get his stored phone numbers off the cell phone when at home, even if the user has a computing device or similar cell phone at his disposal. As is evident, these drawbacks result from the separate devices each containing their own data.

Corporate networks and the like can provide users with remote access to some of their data, but many users do not have access to such a network. For many of those that have access, connecting to a network with the many different types of devices, assuming such devices can even connect to a network, can be a complex or overwhelming problem.

Moreover, even if a user has centrally stored data, the user needs the correct type of device running the appropriate application program to access that data. For example, a user with a PDA that maintains a user's schedule (e.g., appointments, meetings and so on) with a simple to-do list application program ordinarily will not be able to use that program to open a calendar stored by an email application program or the like at work. In general, this is because the data is formatted and accessed according to the way the application program wants it to be formatted.

What is needed is a model wherein data is centrally stored for users, with a set of services that control access to the data with defined methods, regardless of the application program and/or device.

SUMMARY OF THE INVENTION

Briefly, the present invention provides a FavoriteWebsites service for centralized (e.g., Internet) access to per-user favorite website data, based on each user's identity, wherein the FavoriteWebsites service includes a schema that defines rules and a structure for the data, and also includes methods that provide access to the data in a defined way. Because the structure of the data is defined from the perspective of the data, not from that of an application program or a device, programs can communicate with the services to access the data, with existing knowledge of the format. In one implementation, the FavoriteWebsites schemas are arranged to provide XML documents, and the services provide methods that control access to the data based on the requesting user's identification, defined role and scope for that role. In this way, data can be accessed by its owner, and shared to an extent determined by the owner. Extensibility is defined into the schema.

Other benefits and advantages will become apparent from the following detailed description when taken in conjunction with the drawings, in which:

DETAILED DESCRIPTION

Exemplary Operating Environment

Figure 1:
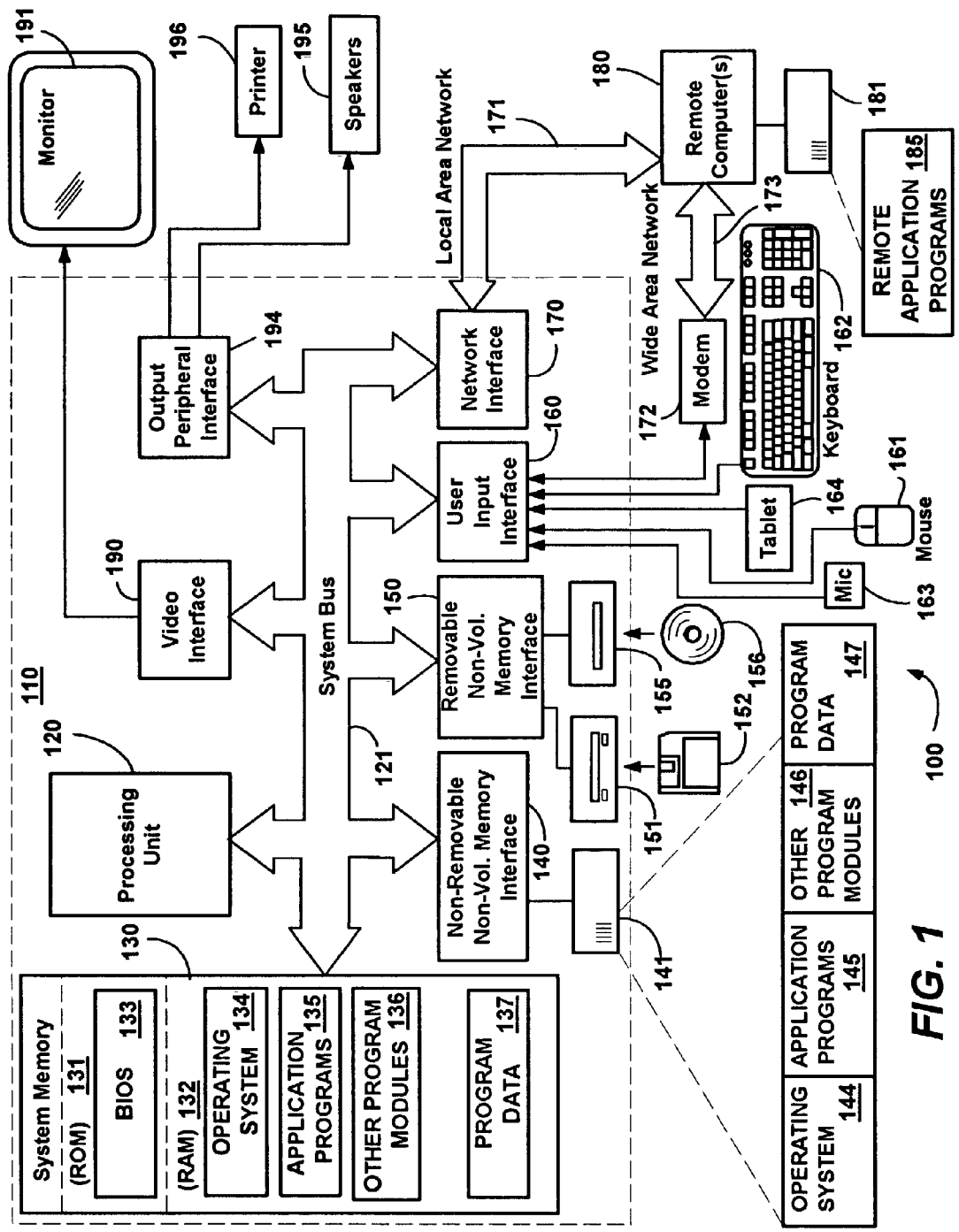
FIG. 1 is a block diagram representing an exemplary computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Data Access Model

The present invention generally operates in an architecture/platform that connects network-based (e.g., Internet-based) applications, devices and services, and transforms them into a user's personal network which works on the user's behalf, and with permissions granted by the user. To this end, the present invention is generally directed to schema-based services that maintain user, group, corporate or other entity data in a commonly accessible virtual location, such as the Internet. The present invention is intended to scale to millions of users, and be stored reliably, and thus it is likely that a user's data will be distributed among and/or replicated to numerous storage devices, such as controlled via a server federation. As such, while the present invention will be generally described with respect to an identity-centric model that enables a user with an appropriate identity and credentials to access data by communicating with various core or other services, it is understood that the schema-based services described herein are arranged for handling the data of millions of users, sorted on a per-user-identity basis. Note that while "user" is generally employed herein for simplicity, as used herein the term "user" is really a substitute for any identity, which may be a user, a group, another entity, an event, a project, and so on.

Figure 2:
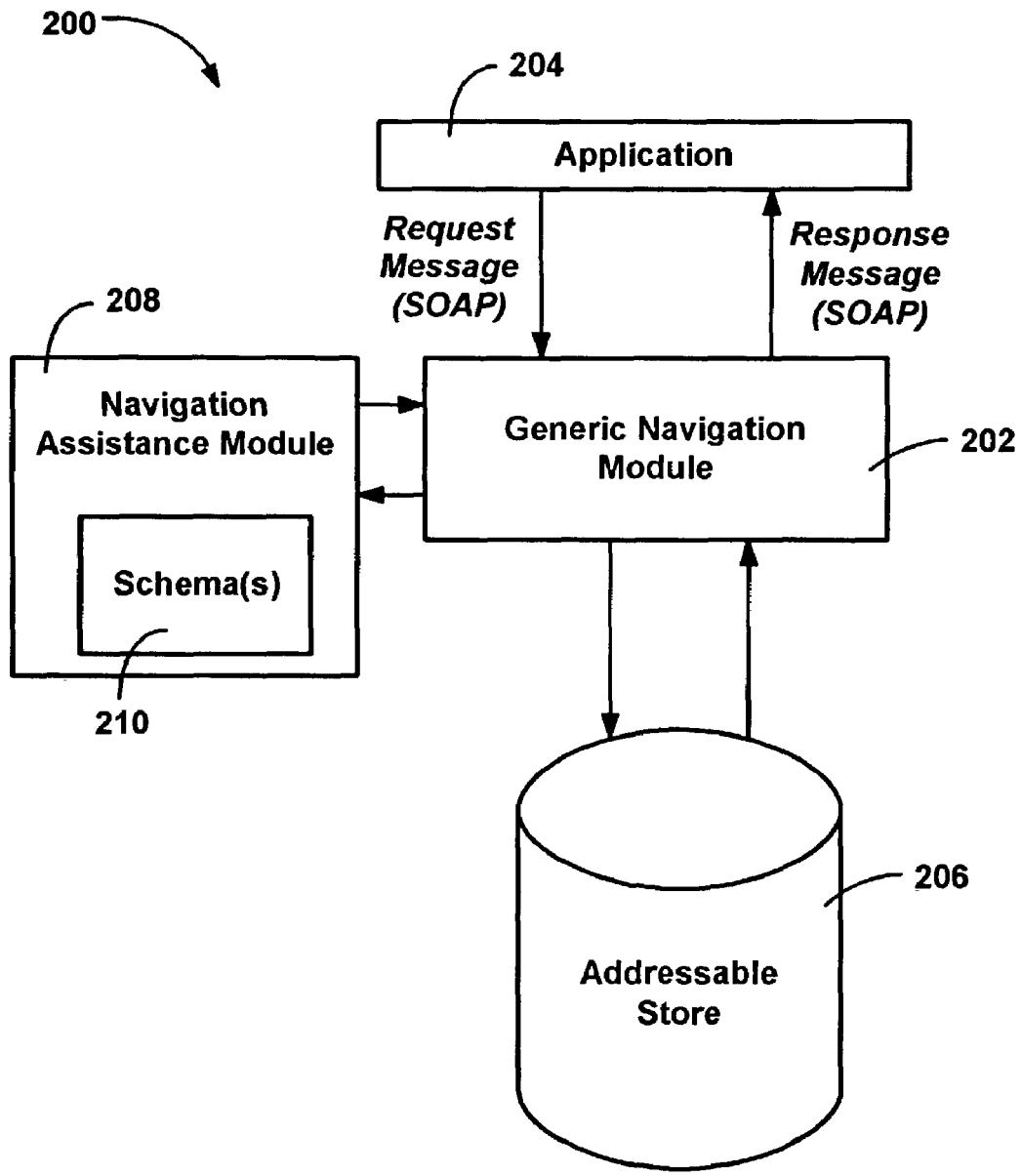
FIG. 2 is a block diagram representing a generic data access model in accordance with one aspect of the present invention.

As generally represented in FIG. 2, a data access model 200 includes a generic navigation module 202 through which applications 204 and the like may access a wide variety of identity-based data, such as maintained in an addressable store 206. To access the data, a common set of command methods may be used to perform operations on various data structures that are constructed from the data in the addressable store 206, even though each of those data structures may represent different data and be organized quite differently. Such command methods may describe generic operations that may be desired on a wide variety of data structures, and include, for example, insert, delete, replace, update, query or changequery methods.

In accordance with one aspect of the present invention and as described in detail below, the data is accessed according to various schemas, with the schemas corresponding to identity-based services through which users access their data. As used herein, a "schema" generally comprises a set of rules that define how a data structure may be organized, e.g., what elements are supported, in what order they appear, how many times they appear, and so on. In addition, a schema may define, via color-coding or other identification mechanisms, what portions of an XML document (that corresponds to the data structure) may be operated on. Examples of such XML-based documents are described below. The schema may also define how the structure of the XML document may be extended to include elements not expressly mentioned in the schema.

As will be understood below, the schemas vary depending on the type of data they are intended to organize, e.g., an email-inbox-related schema organizes data differently from a schema that organizes a user's favorite websites, (e.g., those that a user has saved links for quick access thereto). Further, the services that employ schemas may vary. As such, the generic navigation module 202 has associated therewith a navigation assistance module 208 that includes or is otherwise associated with one or more schemas 210. As will be understood, a navigation assistance module 208 as represented in FIG. 2 corresponds to one or more services, and possesses the information that defines how to navigate through the various data structures, and may also indicate which command methods may be executed on what portions of the data structure. Although in FIG. 2 only one navigation assistance module 208 is shown coupled to the generic navigation module 202, there may be multiple navigation assistance modules that may each specialize as desired. For example, each navigation assistance module may correspond to one service. Moreover, although the navigation assistance module 208 is illustrated as a separate module, some or all of the operations of the navigation assistance module 208 may be incorporated into the generic navigation module 202, and vice versa. In one embodiment, the various data structures constructed from the schema and addressable store data may comprise XML documents of various XML classes. In that case, the navigation assistance module 208 may contain a schema associated with each of the classes of XML documents.

The present invention provides a number of schema-based services that facilitate data access based on the identity of a user. Preferably, the user need not obtain a separate identity for each service, but rather obtains a single identity via a single set of credentials, such as with the Microsoft® Passport online service. With such an identity, a user can access data via these services from virtually any network connectable device capable of running an application that can call the methods of a service.

Services and Schemas

".NET My Services" comprises identity-centric services which may be generally implemented in XML (extensible Markup Language) Message Interfaces (XMIs). While the present invention will be described with respect to XML and XMI, it can readily be appreciated that the present invention is not limited to any particular language or set of interfaces. The .NET My Services model essentially corresponds to one implementation of the generic data access model 200 of FIG. 2.

Figure 3:
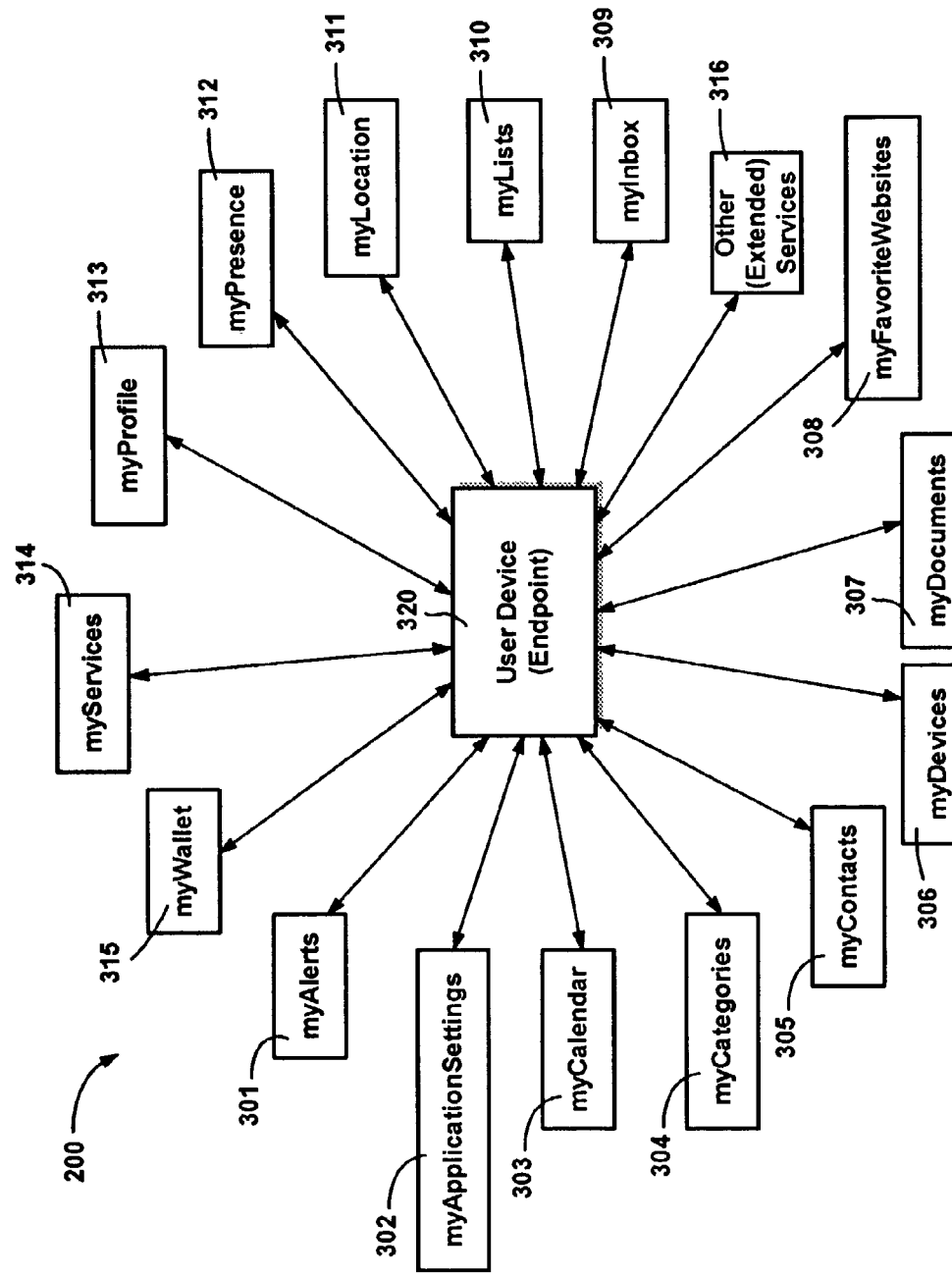
FIG. 3 is a representation of services for identity-based data access in accordance with one aspect of the present invention.

As generally represented in FIG. 3, .NET My Services 300 is implemented as a set of Web services 301-316, each bound to a .NET Identity (PUID, such as a Passport® unique identifier similar to a globally unique identifier when Passport® is the authentication service). The services 301-316 can communicate with one another via a service-to-service communications protocol (SSCP), described below. As also described below, each service presents itself as a set of XML documents that can be manipulated from an application program 202 (FIG. 2) or the like using a set of standard methods and domain-specific methods. To this end, a user device 320 (endpoint) running such application programs connects a user's applications to the services, and the data controlled by those services, such as over the Internet or an Intranet, such as over the Internet or an Intranet. Note that endpoints can be client devices, applications or services. In keeping with the present invention, virtually any device capable of executing software and connecting to a network in any means may thus give a user access to data that the user is allowed to access, such as the user's own data, or data that a friend or colleague has specified as being accessible to that particular user.

In general, a .NET Identity is an identifier assigned to an individual, a group of individuals, or some form of organization or project. Using this identifier, services bound to that identity can be located and manipulated. A general effect is that each identity (e.g., of a user, group or organization) has tied to it a set of services that are partitioned along schema boundaries and across different identities. As will be understood, the XML-document-centric architecture of .NET My Services provides a model for manipulating and communicating service state that is very different from prior data access models. The XML-document-centric approach, in conjunction with loose binding to the data exposed by the services, enables new classes of application programs. As will also be understood, the .NET My Services model 300 presents the various services 301-316 using a uniform and consistent service and method model, a uniform and consistent data access and manipulation model, and a uniform and consistent security authorization model.

In a preferred implementation, the .NET My Services model 300 is based upon open Internet standards. Services are accessed by means of SOAP (Simple Object Access Protocol) messages containing an XML payload. Service input and output is expressed as XML document outlines, and each of these document outlines conform to an XML schema document. The content is available to a user interacting with the .NET My Services service endpoint 320.

Figure 4:
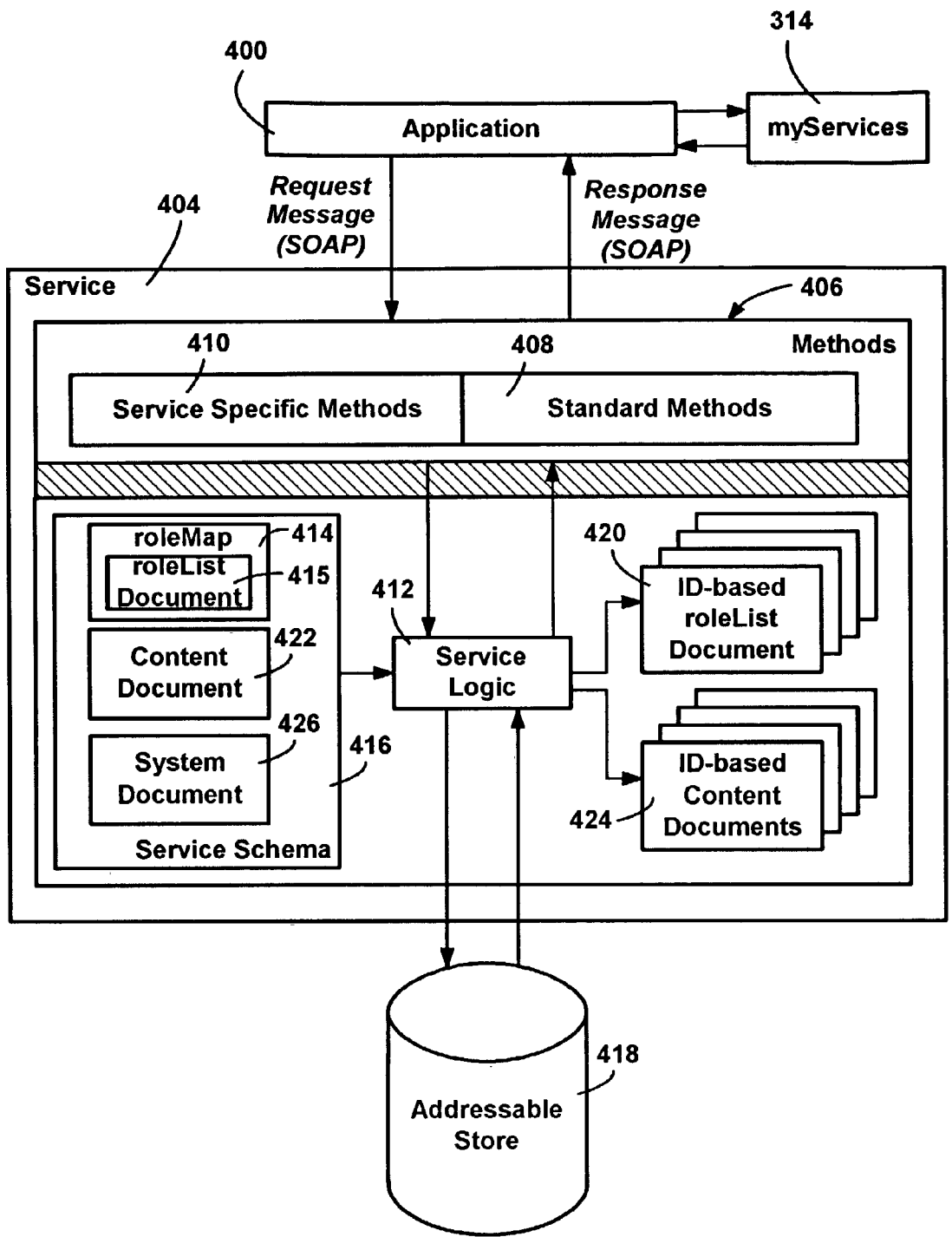
FIG. 4 is a block diagram representing a schema-based service for accessing data arranged in a logical content document based on a defined schema for that service in accordance with one aspect of the present invention.

Turning to FIG. 4, in the .NET My Services model, an application 400 requests performance of a method that operates on data structures. The application may make a request that is generic with respect to the type of data structure being operated upon and without requiring dedicated executable code for manipulating data structures of any particular data type. To this end, in one implementation the application first contacts a special myServices service 314 to obtain the information needed to communicate with a particular service 404, through a set of methods 406 of that service 404. For example, the needed information received from the myServices service 314 includes a URI of that service 404. Note that the service 404 may correspond to essentially any of the services represented in FIG. 3, such as the myFavoriteWebsites service 308.

In an alternate implementation, the services and data may be available on an intranet or the like. In such an event, it may be unnecessary to use the myServices service 314, e.g., if the URI of the desired services are fixed for any user of the intranet. Notwithstanding, a more flexible approach with an intranet may be to have the myServices service that simply provides an intranet URI, such as from a simple lookup table, whereby an administrator and the applications would not be bound to anything fixed.

The service 404 includes or is otherwise associated with a set of methods 406 including standard methods 408, such as to handle requests directed to insert, delete, replace, update, query or changequery operations on the data. The set of methods of a particular service may also include service specific methods 410. In general, the only way in which an application can communicate with a service are via that service's methods.

Each service includes service logic 412 for handling requests and providing suitable responses. To this end, the service logic performs various functions such as authorization, authentication, and signature validation, and further limits valid users to only the data which they are permitted to access. The security aspect of a service is not discussed herein, except to note that in general, for otherwise valid users, the user's identity determines whether a user can access data in a requested manner. To this end, a roleMap 414 comprising service-wide roleList document templates 415 and scopes (e.g., part of the overall service's schema 416), in conjunction with user-based data maintained in an addressable store 418, determines whether a particular requested method is allowed, e.g., by forming an identity-based roleList document 420. If a method is allowed, the scope information in the roleMap 414 determines a shape of data to return, e.g., how much content is allowed to be accessed for this particular user for this particular request. The content is obtained in accordance with a content document 422 in the service's schema 416 and the actual user data corresponding to that content document in the addressable store 418. In this manner, a per-identity shaped content document 424 is essentially constructed for returning to the user, or for updating the addressable store, as appropriate for the method. Note that FIG. 4 includes a number of ID-based roleList documents and ID-based content documents, to emphasize that the service 406 is arranged to serve multiple users. Also, in FIG. 4, a system document 426 is present as part of the schema 416, as described below.

Returning to FIG. 3, in one implementation, access to .NET My Services 300 is accomplished using SOAP messages formatted with .NET My Services-specific header and body content. Each of the .NET My Services will accept these messages by means of an HTTP POST operation, and generate a response by "piggy-backing" on the HTTP Response, or by issuing an HTTP POST to a .NET My Services response-processing endpoint 320. In addition to HTTP as the message transfer protocol, .NET My Services will support raw SOAP over TCP, a transfer protocol known as Direct Internet Message Encapsulation (or DIME). Other protocols for transferring messages are feasible.

Because .NET My Services are accessed by protocol, no particular client-side binding code, object models, API layers, or equivalents are required, and are thus optional. The .NET My Services will support Web Services Description Language (WSDL). It is not mandatory that applications wishing to interact with .NET My Services make use of any particular bindings, and such bindings are not described herein. Instead, the present invention will be generally described in terms of messages that flow between requestors of a particular service and the service endpoints. In order to interact with .NET My Services, a service needs to format a .NET My Services message and deliver that message to a .NET My Services endpoint. In order to format a message, a client needs to manipulate XML document outlines, and typically perform some simple, known (public-domain) cryptographic operations on portions of the message.

In accordance with one aspect of the present invention, and as described in FIG. 4 and below, in one preferred implementation, services (including the myFavoriteWebsites service 308) present three logical XML documents, a content document 422, roleList document 415 (of the roleMap 414), and a system document 426. These documents are addressable using .NET My Services message headers, and are manipulated using standard .NET My Services methods. In addition to these common methods, each service may include additional domain-specific methods, such as updateNotificationData.

Each .NET MyServices service thus logically includes a content document 422, which in general is the main, service-specific document. The schema for this document 422 is a function of the class of service, as will become apparent from the description of the myFavoriteWebsites service's content document below. For example, in the case of the myFavoriteWebsites service 308, the content document presents data in the shape dictated by the .NET myFavoriteWebsites schema, whereas in the case of the ".NET Calendar service 303, the content document presents data in the shape dictated by a .NET myCalendar schema.

Each service also includes a roleList document 415 that contains roleList information, comprising information that governs access to the data and methods exported by the service 404. The roleList document is manipulated using the .NET My Services standard data manipulation mechanisms. The shape of this document is governed by the .NET My Services core schema's roleListType XML data type.

Each service also includes a system document 426, which contains service-specific system data such as the roleMap, schemaMap, messageMap, version information, and service specific global data. The document is manipulated using the standard .NET data manipulation mechanism, although modifications are limited in a way that allows only the service itself to modify the document. The shape of this system document 426 may be governed by the system document schema for the particular service, in that each service may extend a base system document type with service specific information.

As is understood, the present invention is generally based on schemas, which in general comprise a set of rules or standards that define how a particular type of data can be structured. Via the schemas, the meaning of data, rather than just the data itself, may be communicated between computer systems. For example, a computer device may recognize that a data structure that follows a particular address schema represents an address, enabling the computer to "understand" the component part of an address. The computer device may then perform intelligent actions based on the understanding that the data structure represents an address. Such actions may include, for example, the presentation of an action menu to the user that represents things to do with addresses. Schemas may be stored locally on a device and/or globally in a federation's "mega-store." A device can keep a locally-stored schema updated by subscribing to an event notification service (in this case, a schema update service) that automatically passes messages to the device when the schema is updated. Access to globally stored schemas is controlled by the security infrastructure.

General Schema Commonality

The .NET My Services data is defined using annotated XSD schema files. The XSD files accurately type the data, but since XSD is a verbose and complex language, it is not a particularly efficient way to convey structure and meaning. Thus, for purposes of simplicity herein, the myFavoriteWebsites schemas are described below in terms of schema outlines with accompanying element/attribute descriptions. These document outlines accurately show the structure of the data contained within a service. However, because the present application is not viewable in color, the nodes, elements and/or attributes of the schema outlines (which may be described as bold blue, or blue), are represented in the schema outlines as boldface type. Those described as underlined red, or red, are represented as underlined type, while others referred to as black are represented in normal type.

The meaning of these bold (blue), underlined (red) and normal (black) items has significance with respect to the data model and to the data language that accesses and manipulates the data (e.g., via the insert, delete, replace, update, query, changequery or other methods). For example, each document described below contains a root element having an element name that matches that of the service, e.g., the myFavoriteWebsites service has a root element named myFavoriteWebsites. The .NET My Services name for this item is the root.

Documents contain elements that resemble first-class top-level objects, including, for example, <catDef/>, <myApplicationsSettings/> (other another name as appropriate) and <order/>. Such items are denoted in the outlines as bold (blue), and may be identified using an <xdb:blue/> tag. Bold (blue) items define major blocks of data within a service. These node sets are directly addressable by an identifier attribute, and their change status is tracked through a changeNumber attribute. Top-level bold blue items may be considered objects. As seen below, some bold (blue) objects contain nested bold blue objects. They usually contain frequently changing underlined (red) properties, which reduces the amount of synchronization traffic. Nested bold (blue) items may be considered property groups.

Each bold blue item contains one or more underlined (red) items which are elements or attributes. These items may be identified using the <xdb:red/> tag. These items are special in that they may be used within predicates (filters) to aid in xdb:bold blue selection. These items are also directly addressable and may be manipulated directly by the data manipulation language.

Each underlined (colored red) element may contain one or more non-colorized elements and attributes, which are valid and semantically meaningful XML items in the service document. Such items are opaque to the data language. These uncolored (i.e., non-bold or underlined) elements and attributes may not be addressed directly, may not be selected in a node selection operation, and may not be used in a predicate node test. Note that if one of these items is in the path to an underlined red item, it may be used in a location step to the underlined red item, but may not be used as the selected node. Note that being opaque does not mean that the item is not considered during schema validation, but rather means that the item may not be used in a predicate, may not be directly addressed, and may not be inserted by itself As can be readily appreciated, in this manner, the .NET My Services thus limits the granularity of access to nodes within the service document, since only xdb:bold blue and xdb:underlined red marked items are directly addressable, and only those elements and attributes tagged with the xdb: underlined red annotation may be used in predicates to influence node selection. Using this technique, the .NET My Services storage system can efficiently manage indexes, increase the performance of node selection, partially shred the document data, and in general (because the node selections are well defined) fine-tune the node selection logic on a per-xdb:blue basis. The primary purpose of the xdb:blue is to define a base-level XML object that is designed to be operated on as a unit. The primary purpose of the xdb:red items is to aid in the selection of xdb:bold blues. The xdb:red items may be changed by the data language primitives so some level of fine-grained manipulation of the data is available, but only in very limited ways.

Bold blue items have unique IDs, which are usually assigned by .NET My Services, and are returned from update operations within the new blueId node. In all cases, the order of xxxBold blue follows the pre-order traversal of the document XML tree. Item IDs are UUIDs in the following format (h stands for a hexadecimal digit): hhhhhhhh-hhhh-hhhh-hhhh-hhhhhhhhhhhh.

In addition to identifiers, names and change numbers, nodes and especially red nodes may include creator identifiers, category information, and {any} fields. Category information enables data to be grouped and/or distinguished in some way, such as to share certain calendar information with golf buddies, send an email to immediately family, designate things such as which telephone number is the user's primary number, e.g., if a user has a second home, and so on. Fields of type "any" may comprise fully-typed, namespace-qualified fields that contain any type of content (e.g., free-form XML) therein. Such "any" fields thus allow extensibility of the schema, yet maintain the defined structure of a schema.

In one implementation, the core data-manipulation language implemented by the .NET My Services includes an insertRequest, or insert message. This primitive inserts any schema-valid XML fragment into a selected context, thereby changing the existing state of the document. A queryRequest, or message, retrieves data, such as to retrieve a document. Multiple queries may be specified in one request, and queries that select nothing are considered successful. It is possible to assert that the number of nodes in the selection falls in a given range. This is expressed using minOccurs and maxOccurs attributes. If a minOccurs/maxOccurs test fails on any node, the request is considered unsuccessful. Note that this is different from a failure code, which would be returned, for example, for a malformed request.

A deleteRequest primitive deletes the selected nodes and all their children. Note that, just like for other requests, attributes may be selected as well as elements. Empty selections result in successful operations, similar to Query. The minOccurs/maxOccurs tests are supported wherever select is allowed.

A replaceRequest primitive (replace message) is designed to replace the content of each of the selected nodes with the specified new content. Selected nodes themselves are not affected in any way. This may be considered as an atomic delete of the content of the selected node, followed by an insert. The content (text, attributes, elements) in the selected nodes are replaced with the new item specified in this message. The node type of the selected node and of the replacement node are thus required to be the same. The changequery request essentially returns result comprising data that has changed.

As mentioned above, each of the services includes a RoleList document and scope information that describes which users have what type of access to which data. For example, a data-owner will have read/write access to his or her own data, and can provide various types of rights to that data to other users based on their IDs, (e.g., read only to some users, read write to others). Each role list identifier may be associated with a scope, by which the kinds of data stored according to a given schema can be controlled per user. For example, a user can give a friend (with one identity) access via a service to a home telephone number, home address and so forth, but can give other users (with other identities) access only to a business telephone number. In general, a scope can be defined such that that it includes everything except any specifically listed items, or excludes everything except any specifically listed items.

.NET Favorite Websites (MyFavoriteWebsites) Service

The MyFavoriteWebSites service is designed to store and manage the addresses and organization of the favorite web sites for an end user. In some ways, the MyFavoriteWebSites service is similar to the "favorites" menu item in Internet Explorer, or the "favorites" button in MSN Explorer, in that both of these applications maintain a user's favorite web sites and track usage. .NET My Services provides this service so that favorite web sites can be used in multiple applications.

MyFavoriteWebSites/Roles

```
The myFavoriteWebSites service controls access by using the
    rt0, rt1, rt2, rt3 and rt99
roleTemplates, using the following scopes:
    scope allElements
        <hs:scope id=7215df55-e4af-449f-a8e4-72a1f7c6a987>
            <hs:shape base=t>
            </hs:shape>
        </hs:scope>
    scope onlySelfElements
        <hs:scope id=a159c93d-4010-4460-bc34-5094c49c1633>
            <hs:shape base=nil>
                <hs:include select=//* [@creator='$callerId']/>
            </hs:shape>
        </hs:scope>
scope onlySelfSubscriptionElements
<hs:scope id=b7f05a6d-75cd-4958-9dfb-f532ebb17743>
            <hs:shape base=nil>
                <hs:include select=//subscription[@creator='$callerId']/>
            </hs:shape>
        </hs:scope>
    scope onlyPublicElements
        <hs:scope id=da025540-a0c0-470f-adcf-9f07e5a5ec8f>
            <hs:shape base=nil>
                <hs:include select=//* [cat/@ref='hs:public']/>
                <hs:include select=//subscription[@creator'$callerId']/>
            </hs:shape>
        </hs:scope>
```

The myFavoriteWebSites roleTemplate rt0 role gives complete read/write access to the information within the content document of the service being protected through this roleTemplate. The following table illustrates the available methods and the scope in effect when accessing the myFavoriteWebSites service through that method while mapped to this roleTemplate:

TABLE

| myFavoriteWebSites roleTemplate rt0 | |
|---|---|
| method | scope/name |
| Query | allElements |
| Insert | allElements |
| Replace | allElements |
| Delete | allElements |
| Update | allElements |

The myFavoriteWebSites roleTemplate rt1 role gives complete read access to all information within the content document of the service being protected through this roleTemplate. Applications mapping to this role also have a limited ability to write to information in the content document. Applications may create nodes in any location, but may only change/replace, or delete nodes that they created. The following table illustrates the available methods and the scope in effect when accessing the myFavoriteWebSites service through that method while mapped to this roleTemplate:

TABLE

| myFavoriteWebSites roleTemplate rt1 | |
|---|---|
| method | scope/name |
| Query | allElements |
| Insert | onlySelfElements |
| Replace | onlySelfElements |
| Delete | onlySelfElements |

The myFavoriteWebSites roleTemplate rt2 role gives complete read access to the information within the content document of the service being protected through this roleTemplate. Applications mapping to this role have very limited write access and are only able to create and manipulate their own subscription nodes. The following table illustrates the available methods and the scope in effect when accessing the myFavoriteWebSites service through that method while mapped to this roleTemplate:

TABLE

| myFavoriteWebSites roleTemplate rt2 | |
|---|---|
| method | scope/name |
| Query | allElements |
| Insert | onlySelfSubscriptionElements |
| replace | onlySelfSubscriptionElements |
| Delete | onlySelfSubscriptionElements |

The myFavoriteWebSites roleTemplate rt3 role gives limited read access to information within the content document that is categorized as "public." The following table illustrates the available methods and the scope in effect when accessing the myFavoriteWebSites service through that method while mapped to this roleTemplate:

| myFavoriteWebSites roleTemplate rt3 | |
|---|---|
| method | scope/name |
| Query | onlyPublicElements |

The myFavoriteWebSites roleTemplate rt99 blocks access to the content document. Note that lack of a role in the roleList has the same effect as assigning someone to rt99.

MyFavoriteWebSites/Content

The content document is an identity centric document, with its content and meaning a function of the user identifier (puid) used to address the service. Accessing the document is controlled by the associated roleList document. The following table comprises a schema outline that illustrates the layout and meaning of the information found in the content document for the myFavoritewebsites service:

```
<m:myFavoriteWebSites changeNumber="..." instanceId="..."
    xmlns:m="http://schemas.microsoft.com/hs/2001/10/
    myFavoriteWebSites"
    xmlns:hs="http://schemas.microsoft.com/hs/2001/10/core">$_{1..1}$
    <m:favoriteWebSite changeNumber="..." id="..." creator
"...">$_{0..unbounded}$
        <m:cat ref="...">$_{0..unbounded}$</m:cat>
        <m:title xml:lang="..." dir="...">$_{0..unbounded}$</m:title>
        <m:url>$_{1..1}$</m:url>
        {any}
    </m:favoriteWebSite>
    <m:subscription changeNumber="..." id="..." creator=
"...">$_{0..unbounded}$
        <hs:trigger select="..." mode="..." baseChangeNumber=
"...">$_{1..1}$</hs:trigger>
        <hs:expiresAt>$_{0..1}$</hs:expiresAt>
        <hs:context uri="...">$_{1..1}$ {any}</hs:context>
        <hs:to>$_{1..1}$</hs:to>
    </m:subscription>
    {any}
</m:myFavoriteWebSites>
```

The /myfavoriteWebSites (minOccurs=1 maxOccurs=1) element encapsulates the content document for the service. The cache scope for this document is the entire content document, that is, there is a single changeNumber attribute, and it occurs at the root element. Any change to the document changes this attribute.

The /myfavoriteWebSites/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myfavoriteWebSites/@instanceId (string minOccurs=0 maxOccurs=1) attribute is a unique identifier typically assigned to the root element of a service. It is a read-only element and assigned by the .NET My Services system when a user is provisioned for a particular service.

The /myfavoriteWebSites/favoriteWebSite (minOccurs=0 maxOccurs=unbounded) element describes a complete favorite Web site, including the title, URL (Uniform Resource Locator), and free-form extensions. This element may contain zero (0) or more category elements that are used to organize favoriteWebSites.

The /myfavoriteWebSites/favoriteWebSite/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /myfavoriteWebSites/favoriteWebSite/@id (minOccurs=0 maxOccurs—1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /myfavoriteWebSites/favoriteWebSite/@creator (string minOccurs=0 maxOccurs 1) attribute identifies the creator in terms of userId, appId, and platformId of the node.

The /myfavoriteWebSites/favoriteWebSite/cat (minOccurs=0 maxOccurs=unbounded) element is used to categorize the element that contains it by referencing a global category definition in either the .NET Categories service system document or an external resource containing category definitions, or by referencing an identity centric category definition in the content document of the .NET Categories service for a particular puid. The /myfavoriteWebSites/favoriteWebSite/cat/@ref (anyURI minOccurs=0 maxOccurs=1) attribute references a category definition (<catDef/>) element using the rules outlined in the myCategories section, above.

The /myfavoriteWebSites/favoriteWebSite/title (string minOccurs=0 maxOccurs=unbounded) element specifies the title of the favorite Web site. A typical use is to fill this element from the HTML <title> element in the Web site referred to by this entry. The /myfavoriteWebSites/favoriteWebSite/title/@xml:lang (minOccurs=1 maxOccurs=1) required attribute is used to specify an ISO 639 language code or an ISO 3166 country code as described in RFC 1766. The value of this attribute indicates the language type of the content within this element. The /myfavoriteWebSites/favoriteWebSite/title/@dir (string minOccurs=0 maxOccurs=1) optional attribute specifies the default layout direction for the localized string. Valid values are rtl (right to left), and ltr (left to right).

The /myfavoriteWebSites/favoriteWebSite/url (anyURI minOccurs=1 maxOccurs=1) required element specifies the URL used to navigate to the Web site referred to by this entry. Its content should be URL-encoded.

The /myfavoriteWebSites/favoriteWebSite/{any} (minOccurs=0 maxOccurs=unbounded) and /myFavoriteWebSites/{any} (minOccurs=0 maxOccurs=unbounded) fields provide for extensibility.

The /myfavoriteWebSites/subscription (minOccurs=0 maxOccurs=unbounded) element defines a subscription node as described above in the subscription section.

MyFavoriteWebsites/System

The system document is a global document for each service, having content and meaning that is independent of the puid used to address the service. The document is read only to all users. Each system document contains a set of base items common to each of the .NET My Services described herein, and is optionally extended by each service to include service-specific global information. The following schema outline illustrates the layout and meaning of the information found in the myFavoriteWebsites system document:

TABLE

/MyFavoriteWebsites/system

```
<sys:system changeNumber="..." instanceId="..."
   xmlns:hs="http://schemas.microsoft.com/hs/2001/10/core"
   xmlns:sys="http://schemas.microsoft.com/hs/2001/10The/
   MyFavoriteWebsites/system" >_{1..1}
   <hs:system VersionchangeNumber="..." id="..."
   creator="..." >_{1..1}
      <hs:version majorVersion="..." minorVersion="..."
         buildNumber="..." qfe="..." >_{1 1}
         <hs:productReleaseName>_{1 1}</hs:productReleaseName>
         <hs:productImplementationName>_{1 1}</
         hs:productImplementationName>
      </hs:version>
      <hs:buildDate>_{1 1}</hs:buildDate>
      <hs:buildDetails machine="..." branch="..." type="..."
         official="..." >_{1..1}</hs:buildDetails>
   </hs:system Version>
   <hs:roleMap changeNumber="..." id="..."
   creator="..." >_{1 1}
      <hs:scope id="..." >_{0 unbounded}
         <hs:name xml:lang="..." dir="..." >_{0 unbounded}</hs:name>
         <hs:shape base="..." >_{1 1}
```

TABLE-continued

/MyFavoriteWebsites/system

```
            <hs:include select="..." >_{0 unbounded}</hs:include>
            <hs:exclude select="..." >_{0 unbounded}</hs:exclude>
         </hs:shape>
      </hs:scope>
      <hs:roleTemplate name="..." priority"..." >_{0 unbounded}
         <hs:fullDescription xml:lang="..." dir="..." >_{0 1}</
         hs:fullDescription>
         <hs:method name="..." scopeRef= "..."0 >_{0 unbounded}</
         hs:method>
      </hs:roleTemplate>
   </hs:roleMap>
   <hs:methodMap changeNumber="..." id="..."
   creator="..." >1 1
      <hs:method name="..." >_{0 unbounded}{any}</hs:method>
   </hs:methodMap>
   <hs:schemaMap changeNumber"..." id="..." creator="..." >_{1 1}
      <hs:schema namespace="..." schemaLocation="..." alias=
      "..." >_{0 unbounded} {any}</hs:schema>
   </hs:schemaMap>
   <hs:wsdlMap changeNumber="..." id="..." creator=
   "..." >_{1 1}
      <hs:wsdl wsdlLocation="..." >_{0 unbounded} {any}</hs:wsdl>
      <hs:disco discoLocation="..." >_{0 unbounded} {any}</hs:disco>
      <hs:wsil wsilLocation="..." >_{0 unbounded} {any}</hs:wsil>
   </hs:wsdlMap>
   </any>
</sys:system>
```

The meaning of the attributes and elements shown in the preceding sample document outline follow, beginning with /system (minOccurs=1 maxOccurs=1), the element that encapsulates a system document common to the various services. Although each service has its own system document, the common system document attributes and elements are described once, for purposes of simplicity, with service-specific system document attributes and elements specified for each service, below. The /system/@changeNumber (minOccurs=0 maxOccurs=1) attribute is designed to facilitate caching of the element and its descendants. This attribute is assigned to this element by the .NET My Services system. The attribute is read-only to applications. Attempts to write this attribute are silently ignored.

The /system/@instanceId (string minOccurs=0 maxOccurs=1) attribute is a unique identifier typically assigned to the root element of a service. It is a read-only element and assigned by the .NET My Services system when a user is provisioned for a particular service.

The /system/systemVersion (minOccurs=0 maxOccurs=1) element defines version information describing this instance of the .NET MyServices service. The /systemVersion/@changeNumber (minOccurs=0 maxOccurs=1) changeNumber attribute is designed to facilitate caching of the element and its descendants. This attribute is assigned to this element by the .NET My Services system. The attribute is read-only to applications; attempts to write this attribute are silently ignored, (e.g., without generating an error).

The /system/systemVersion/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /system/systemVersion/@creator (string minOccurs=0 maxOccurs=1) attribute identifies the creator in terms of userId, appId, and platformId of the node. The /system/systemVersion/version (minOccurs=1 maxOccurs=1) element defines major, minor, and build number version information. The /system/systemVersion/version/@majorVersion (string minOccurs=0 maxOccurs=1) attribute specifies the major version number of the .NET MyServices service.

The /system/systemVersion/version/@minorVersion (string minOccurs=0 maxOccurs=1) attribute specifies the minor version number of the .NET MyServices service. The /system/systemVersion/version/@buildNumber (string minOccurs=0 maxOccurs=1) attribute specifies the build-Number of the .NET MyServices service. The /system/systemVersion/version/®qfe (string minOccurs=0 maxOccurs=1) attribute specifies the qfe version number of the .NET MyServices service. The /system/systemVersion/version/productReleaseName (string minOccurs=1 maxOccurs=1) element defines the major product release string (as in .NET My Services Beta 1, and so on). The /system/systemVersion/version/productImplementationName (anyURI minOccurs=1 maxOccurs 1) element defines the class of the service to differentiate between different implementations.

The /system/systemVersion/buildDate (dateTime minOccurs=1 maxOccurs=1) element defines the date and time that the .NET My Services system was built. The time is in UTC (Z relative) form. The /systemVersion/buildDetails (minOccurs=1 maxOccurs=1) element defines details of the build including the machine that generated the build, the branch id of the software that contributed to the build, the type of build (chk/fre), and if the build was generated by an official build release process.

The /system/systemVersion/buildDetails/@machine (string minOccurs=0 maxOccurs=1) attribute specifies the machine that generated the build. The system/systemVersion/buildDetails/@branch (string minOccurs=0 maxOccurs=1) attribute specifies the software branch id for the source code that contributed to this build. The /system/systemVersion/buildDetails/@type (string minOccurs=0 maxOccurs=1) attribute specifies the type of build. A value of chk indicates that this is a checked or debug build. A value of fre indicates that this is a retail build. The /system/systemVersion/buildDetails/@official (string minOccurs=0 maxOccurs=1) attribute indicates that the build was produced by an official build process (value of yes), or an unofficial process (value of no).

The /system/roleMap (minOccurs=1 maxOccurs=1) element encapsulates all the elements that make up a roleMap, which include document class relative roleTemplate, priority, name, method, and per-method scope. An individual roleTemplate defines the maximum scope of information, and the allowable methods used to access that information for each request mapped into the template. The /system/roleMap/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored. The /system/roleMap/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /system/roleMap/@creator (string minOccurs=0 maxOccurs=1) attribute identifies the creator in terms of userId, appId, and platformId of the node. The /system/roleMap/scope (minOccurs=0 maxOccurs=unbounded) element defines a scope which may be referred to by roles within this roleMap to indicate what portions of the document are visible to this role for the specified method.

The /system/roleMap/scope/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored. The /system/roleMap/scope/name (string minOccurs=0 maxOccurs=unbounded) node includes the /system/roleMap/scope/name/@xml:lang (minOccurs=1 maxOccurs=1) required attribute, which is used to specify an ISO 639 language code or an ISO 3166 country code as described in RFC 1766. The value of this attribute indicates the language type of the content within this element. The /system/roleMap/scope/name/@dir (string minOccurs=0 maxOccurs=1) optional attribute specifies the default layout direction for the localized string. Valid values are rtl (right to left), and ltr (left to right).

The /system/roleMap/scope/shape (minOccurs=1 maxOccurs=1) comprises a shape that defines the node set that is visible through the document when operating through this shape element. The /system/roleMap/scope/shape/@base (string minOccurs=0 maxOccurs=1) attribute specifies the initial set of nodes visible through the shape. A value of t indicates that the shape is initialized to include all possible nodes relative to the shape that is currently in effect. For instance, each role defines a scope containing a shape. When defining a shape for a role, the value t indicates all possible nodes available in the specified document for this role. When defining a shape in an ACL entry, a value of t means all of the nodes visible in the shape for the computed role. When using a shape in a data language (e.g., query, insert, replace and so on) operation, a value of t indicates all of the possible nodes selected by the data language operation (relative to the ACL shape which itself is relative to the role's shape). The value nil indicates the opposite of t, which is the empty node set. Nodes from this set may then be included into the shape.

The /system/roleMap/scope/shape/include (minOccurs=0 maxOccurs=unbounded) element specifies the set of nodes that should be included into the shape relative to the possible set of nodes indicated by the base attribute. The /system/roleMap/scope/shape/include/@select (string minOccurs=0 maxOccurs=1) item specifies an XPATH expression that selects a set of nodes relative to the externally established context. The expression can never travel outside the node-set established by this externally established current context. The expression may match zero or more nodes, and the operation manipulates all selected nodes. The minOccurs and maxOccurs attributes are optional and place restrictions and limitations on the number of nodes selected.

The /system/roleMap/scope/shape/exclude (minOccurs=0 maxOccurs=unbounded) element specifies the set of nodes that should be excluded from the shape relative to the possible set of nodes indicated by the base attribute. The /system/roleMap/scope/shape/exclude/@select (string minOccurs=0 maxOccurs=1) item specifies an XPATH expression that selects a set of nodes relative to the externally established context. The expression can never travel outside the node-set established by this externally established current context. The expression may match zero (0) or more nodes, and the operation manipulates all selected nodes. The minOccurs and maxOccurs attributes are optional and place restrictions and limitations on the number of nodes selected. The /system/roleMap/roleTemplate (minOccurs=0 maxOccurs=unbounded) element encapsulates the definition of a role. The attribute set for this element includes the document class that this roleTemplate refers to, the name of the roleTemplate, and the priority of the roleTemplate.

The /system/roleMap/roleTemplate/@name (string minOccurs=0 maxOccurs=1) element specifies the name of the role. The /system/roleMap/roleTemplate/@priority (int minOccurs=0 maxOccurs=1) element specifies the priority of the roleTemplate which is used to select that actual roleTemplate when the role evaluation determines that the subject maps to multiple roleTemplates.

The /system/roleMap/roleTemplate/fullDescription (string minOccurs=0 maxOccurs=1) element contains a description of this role template which specifies the capabilities a caller will have when accessing information through this role. The /system/roleMap/roleTemplate/fullDescription/@xml:lang (minOccurs=1 maxOccurs=1) required attribute is used to specify an ISO 639 language code or an ISO 3166 country code as described in RFC 1766. The value of this attribute indicates the language type of the content within this element. The /system/roleMap/roleTemplate/fullDescription/@dir (string minOccurs=0 maxOccurs=1) optional attribute specifies the default layout direction for the localized string. Valid values are rtl (right to left), and ltr (left to right).

The /system/roleMap/roleTemplate/method (minOccurs=0 maxOccurs=unbounded) element specifies the methods available within this roleTemplate by name, and by scope. When a subject maps to a roleTemplate, the method in the request must match one of these elements for the message to continue to flow. If the method exists, the data available to the method is a function of the scope referenced by this method combined with an optional scope referenced by the role defined in the roleList.

The /system/roleMap/roleTemplate/method/@name (string minOccurs=0 maxOccurs=1) element specifies the name of the method. The /system/roleMap/roleTemplate/method/@scopeRef (string minOccurs=0 maxOccurs=) attribute specifies the scope within this document that is in effect for this method. The /system/methodMap (minOccurs=1 maxOccurs=1) element defines the methodMap. While in most cases, the roleMap section contains a definitive list of methods, these methods are likely to be scattered about the roleMap in various templates. This section contains the definitive non-duplicated list of methods available within the service.

The /system/methodMap/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /system/methodMap/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored. The /system/methodMap/@creator (string minOccurs=0 maxOccurs=1) attribute identifies the creator in terms of userId, appId, and platformId of the node.

The /system/methodMap/method (minOccurs=0 maxOccurs=unbounded) element defines a method that is available within this service. The /system/methodMap/method/@name (string minOccurs=0 maxOccurs=1) attribute specifies the name of a method available within the service. The /system/methodMap/method/{any} (minOccurs=0 maxOccurs=unbounded) provides for extensibility. The /system/schemaMap (minOccurs=1 maxOccurs=1) element defines the various schema's that define the data structures and shape of information managed by this service. Each schema is defined by its namespace URI, its location, and a preferred namespace alias.

The /system/schemaMap/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /system/schemaMap/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored.

The /system/schemaMap/@creator (string minOccurs=0 maxOccurs=1) attribute identifies the creator in terms of userId, appId, and platformId of the node. The /system/schemaMap/schema (minOccurs=0 maxOccurs=unbounded) element defines a schema which defines data-structures and the shape of information managed by this service. Multiple schema elements exist for each service, once for each logical grouping of information exposed by the service. The /system/schemaMap/schema/@namespace (anyURI minOccurs=0 maxOccurs=1) attribute specifies the namespace URI of this schema. The /system/schemaMap/schema/@schemaLocation (anyURI minOccurs=0 maxOccurs=1) attribute specifies the location (in the form of a URI) of the resource containing schema. When a schema is reachable through a variety of URIs, one schema element will exist for each location.

The /system/schemaMap/schema/@alias (string minOccurs=0 maxOccurs=1) attribute specifies the preferred alias that should be used if possible when manipulating information covered by this schema in the context of this service. The /system/schemaMap/schema/{any} (minOccurs=0 maxOccurs=unbounded) provides for extensibility. The /system/wsdlMap (minOccurs=1 maxOccurs=1) element defines the wsdlMap for this service. This map includes the location of WSDL documents, DISCO documents, and WSIL documents for this web service. These documents are used by applications to understand the format of messages that may be sent to the various services. The /system/wsdlMap/@changeNumber (minOccurs=0 maxOccurs=1) changeNumber attribute is designed to facilitate caching of the element and its descendants. This attribute is assigned to this element by the .NET My Services system. The attribute is read-only to applications. Attempts to write this attribute are silently ignored.

The /system/wsdlMap/@id (minOccurs=0 maxOccurs=1) attribute is a globally unique ID assigned to this element by .NET My Services. Normally, .NET My Services will generate and assign this ID during an insertRequest operation, or possibly during a replaceRequest. Application software can override this ID generation by specifying the useClientIds attribute in the request message. Once an ID is assigned, the attribute is read-only and attempts to write it are silently ignored. The /system/wsdlMap/@creator (string minOccurs=0 maxOccurs=1) attribute identifies the creator in terms of userId, appId, and platformId of the node.

The /system/wsdlMap/wsdl (minOccurs=0 maxOccurs=unbounded) element is used to specify the location of a WSDL file for this service. Multiple entries may exist pointing to the same file hosted in multiple locations, or to variations on the content within the WSDL files.

The /system/wsdlMap/wsdl/®wsdlLocation (anyURI minOccurs=0 maxOccurs=1) attribute is a URI that specifies the location of the WSDL file. The /system/wsdlMap/wsdl/{any} (minOccurs=0 maxOccurs=unbounded) provides for extensibility.

The /system/wsdlMap/disco (minOccurs=0 maxOccurs=unbounded) element is used to specify the location of a DISCO (web-services discovery) file for this service. Multiple entries may exist pointing to the same file hosted in multiple locations, or to variations on the content within the DISCO files. The /system/wsdlMap/disco/®discoLocation (anyURI minOccurs=0 maxOccurs=1) attribute is a URI that specifies the location of the DISCO file. The /system/wsdlMap/disco/{any} (minOccurs=0 maxOccurs=unbounded) provides extensibility. The /system/wsdlMap/wsil (minOccurs=0 maxOccurs=unbounded) element is used to specify the location of a WSIL file for this service. Multiple entries may exist pointing to the same file hosted in multiple locations, or to variations on the content within the WSIL files. The /system/wsdlMap/wsdl/®wsilLocation (anyURI minOccurs=0 maxOccurs=1) attribute is a URI that specifies the location of the WSIL file. The /system/wsdlMap/wsil/{any} (minOccurs=0 maxOccurs=unbounded) provides extensibility.

MyfavoriteWebsites Methods

The myFavoriteWebsites service supports the standard methods.

As can be seen from the foregoing detailed description, there is provided a schema-based myFavoriteWebsites service that allows users to access their website data based on their identities and corresponding roles with respect to the data. The schema-based myFavoriteWebsites service provides data access independent of the application program and device, and in a centrally-accessible location such as the Internet. The schema-based myFavoriteWebsites service is extensible to handle extended Favorite websites information.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computer network that includes a plurality of services configured to access stored favorite websites data from a centralized schema-based favorite websites service, the favorite websites data including a plurality of favorite website elements, each favorite website element identifying a website and a corresponding entity, from among a plurality of different entities, that selected the identified website as a favorite website, a method comprising:

receiving a request for favorite websites data corresponding to an entity, the request sent from a requesting service, from among the plurality of services, running on a device, the requesting service using a service to service protocol to request the favorite websites data corresponding to the entity, the request including associated identity information identifying a role for requesting entity with respect to the favorite website data corresponding to the entity;

determining that the favorite websites data corresponding to the entity is accessible to the request based on the identified role for the requesting entity;

retrieving one or more favorite website elements corresponding to the entity in response to the request, each favorite website element including at least a title, a Uniform Resource Locator (URL), and metadata for a favorite website selected by the entity;

constructing a favorite websites eXstensible Markup Language (XML) document containing the one or more favorite website elements for return to the requesting service, the constructed favorite websites XML document formatted in accordance with a content document that defines a layout and meaning for data in the favorite website elements contained in the favorite websites XML document;

returning the favorite websites XML document, including the one or more favorite website elements, to the device in response to the request.

2. The method of claim 1 wherein each favorite website element includes at least one defined field for storing extensibility data related to a favorite website selected by a user.

3. In a computer network that includes a plurality of services configured to access stored favorite websites data from a centralized schema-based favorite websites service, the favorite websites data including a plurality of favorite website elements, each favorite website element identifying a website and a corresponding entity, from among a plurality of different entities, that selected the identified website as a favorite website, a method comprising:

sending a request for favorite websites data corresponding to an entity, the request sent from a requesting service, from among the plurality of servers, using a service to service protocol, the request including associated identity information identifying a role for a requesting entity and directed towards the centralized schema-based favorite websites service;

receiving a favorite websites eXtensible Markup Language (XML) document in response to the request, the favorite websites XML document containing one or more favorite website elements corresponding to the entity, each favorite website element including at least a title, a Uniform Resource Locator (URL), and metadata for a favorite website selected by the entity, the favorite websites XML document formatted in accordance with a content document that defines a layout and meaning for data in the favorite website elements contained in the favorite websites XML document, reception of the favorite websites XML document indicative of the identified role having access to the favorite website data corresponding to the entity; and presenting the one or more favorite website elements contained in the favorite websites XML document to provide a list of favorite websites selected by the entity, the list including the titles to enable selection of a website by a user, and the URLs for automatically accessing a selected website.

4. The method of claim 3 wherein each favorite website element includes at least one defined field for storing extensibility data related to a favorite website selected by the user.

5. The method of claim 3 wherein the associated identity information includes at least one defined field comprising data corresponding to a password associated with a user name.

6. The method as recited in claim 1, wherein receiving a request for favorite websites data corresponding to an entity comprises receiving a request
to manipulate favorite websites data corresponding to the enttity.

7. The method of claim 6 further comprising manipulating a favorite website element for the entity by reading data from at least one field in the favorite website element.

8. The method of claim 6 further comprising manipulating favorite website element for the entity by writing data to at least one field in the favorite website element.

9. In a computer network that includes a plurality of services configured to access stored favorite websites data from a centralized schema-based favorite websites service, the favorite websites data including a plurality of favorite website elements, each favorite website element identifying a website and a corresponding entity, from among a plurality of different entities, that selected the identified website as a favorite website, a computer-readable medium having computer executable instructions for:
receiving a request for favorite websites data corresponding to an entity, the request sent from a requesting service, from among the plurality of services, running on a device, the requesting service using a service to service protocol to request the favorite websites data corresponding to the entity, the request including associated identity information identifying a role for requesting entity with respect to the favorite website data corresponding to the entity;
determining that the favorite websites data corresponding to the entity is accessible to the request based on the identified role for the requesting entity;
retrieving one or more favorite web sites elements corresponding to the entity in response to the request each favorite website element including at least a title, a Uniform Resource Locator (URL), and metadata for a favorite website selected by the entity;
constructing a favorite websites eXstensible Markup Language (XML) document containing the one or more favorite website elements for return to the requesting service, the constructed favorite websites XML document formatted in accordance with a content document that defines a layout and meaning for data in the favorite website elements contained in the favorite websites XML document;
returning the favorite websites XML document, including the one or more favorite website elements, to the device in response to the request.

10. The computer-readable medium of claim 9 wherein each favorite website element comprises at least one defined field for storing extensibility data related to a favorite web site selected by a user.

11. In a computer network that includes a plurality of services configured to access stored favorite websites data from a centralized schema-based favorite websites service, the favorite websites data including a plurality of favorite website elements, each favorite website element identifying a website and a corresponding entity, from among a plurality of different entities, that selected the identified website as a favorite website, a computer-readable medium having computer executable instructions for:
sending a request for favorite websites data corresponding to an entity, the request sent from a requesting service, from among the plurality of servers, using a service to service protocol, the request including associated identity information identifying a role for a requesting entity and directed towards the centralized schema-based favorite websites service;
receiving a favorite websites eXtensible Markup Language (XML) document in response to the request, the favorite websites XML document containing one or more favorite website elements corresponding to the entity, each favorite website element including at least a title, a Uniform Resource Locator (URL), and metadata for a favorite website selected by the entity, the favorite websites XML document formatted in accordance with a content document that defines a layout and meaning for data in the favorite website elements contained in the favorite websites XML document, reception of the favorite websites XML document indicative of the identified role having access to the favorite website data corresponding to the entity; and
presenting the one or more favorite website elements contained in the favorite websites XML document-to provide a list of favorite websites selected by the entity, the list including the titles to enable selection of a website by a user and the URLs for automatically accessing a selected website.

12. The computer-readable medium of claim 11 wherein each favorite website element includes at least one defined field for storing extensibility data related to a favorite website selected by the user.

13. The computer-readable medium of claim 11 wherein the associated identity information includes at least one defined field comprising data corresponding to a password associated with a user name.

14. The method of claim 1, wherein a website selected as favorite website comprises a website the entity has saved a link to for quick access to the selected website.

15. The method of claim 3, wherein a website selected as favorite website comprises a website the entity has saved a link to for quick access to the selected website.

* * * * *